(12) United States Patent
Schiebel

(10) Patent No.: US 7,721,988 B2
(45) Date of Patent: May 25, 2010

(54) UNMANNED HELICOPTER

(75) Inventor: Hans-Georg Schiebel, Vienna (AT)

(73) Assignee: Schiebel Industries AG, Vienna (AT)

( * ) Notice: Subject to any disclaimer, the term of this patent is extended or adjusted under 35 U.S.C. 154(b) by 535 days.

(21) Appl. No.: 10/572,023

(22) PCT Filed: May 27, 2005

(86) PCT No.: PCT/AT2005/000183
§ 371 (c)(1),
(2), (4) Date: Mar. 13, 2006

(87) PCT Pub. No.: WO2006/005087
PCT Pub. Date: Jan. 19, 2006

(65) Prior Publication Data
US 2008/0251631 A1    Oct. 16, 2008

(30) Foreign Application Priority Data
Jul. 15, 2004    (AT) .............................. A 1202/2004

(51) Int. Cl.
B64C 27/04    (2006.01)
(52) U.S. Cl. .................................. 244/17.11
(58) Field of Classification Search .............. 244/17.11, 244/135 R, 117 A, 119, 54, 17.19; 446/36–37, 446/33
See application file for complete search history.

(56) References Cited

U.S. PATENT DOCUMENTS

| 1,380,391 | A | * | 6/1921 | Kehl ............................... 244/6 |
| 2,968,920 | A | * | 1/1961 | Cleveland et al. ............. 60/761 |
| 3,420,477 | A | * | 1/1969 | Howard ................... 244/135 R |
| 3,517,898 | A | * | 6/1970 | Laville et al. ................ 244/7 R |
| 3,966,145 | A | * | 6/1976 | Wiesner ................... 244/17.11 |
| 4,711,415 | A | * | 12/1987 | Binden .................... 244/17.19 |
| 4,830,312 | A | * | 5/1989 | Hain et al. ............... 244/17.11 |
| 5,232,183 | A | * | 8/1993 | Rumberger .............. 244/17.19 |
| 6,039,287 | A | * | 3/2000 | Liston et al. ................... 244/54 |
| 6,126,113 | A | * | 10/2000 | Navickas .................... 244/120 |

FOREIGN PATENT DOCUMENTS

| EP | 1044709 | 8/2005 |
| JP | 04031196 | 2/1992 |
| JP | 10263215 | 10/1998 |
| JP | 2002198193 | 7/2002 |

* cited by examiner

Primary Examiner—Tien Dinh
(74) Attorney, Agent, or Firm—Andrew Wilford

(57) ABSTRACT

The invention relates to an unmanned helicopter comprising an internal combustion engine and an associated fuel tank. The unit (1) formed by the internal combustion engine and the gearbox is arranged essentially in a self-supporting housing (2) which is at least partially closed all the way round, and preferably consists of carbon fiber-reinforced plastic (CFK), a nose body (3) being connected to the front of said housing. In this way, a compact structure can be achieved.

5 Claims, 3 Drawing Sheets

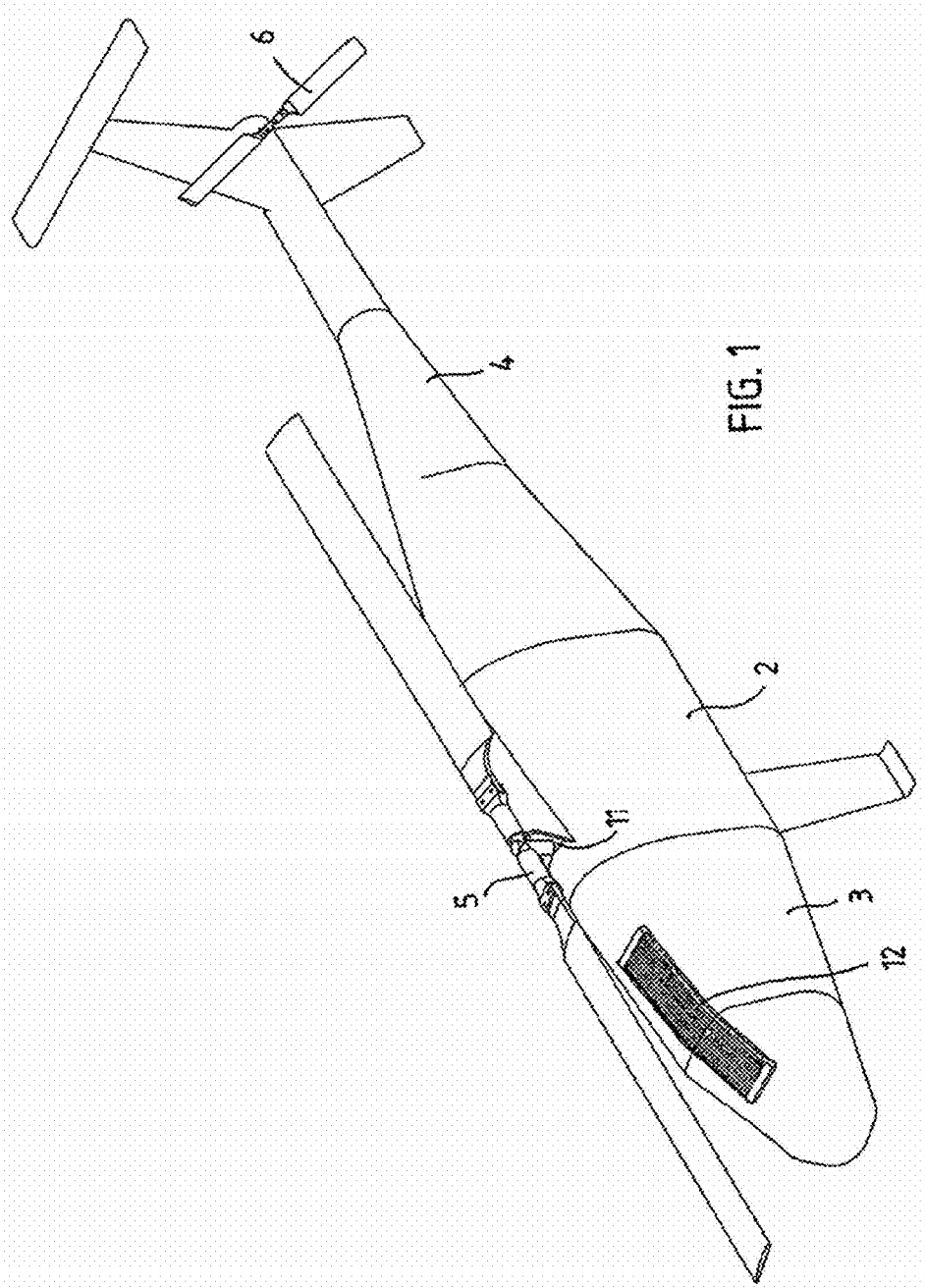

UNMANNED HELICOPTER

CROSS REFERENCE TO RELATED APPLICATIONS

This application is the U.S. national phase of PCT application PCT/AT2005/000183, filed 27 May 2005, published 19 Jan. 2006 as WO2006/005087, and claiming the priority of Austrian patent application A1202/2004 itself filed 15 Jul. 2004, whose entire disclosures are herewith incorporated by reference.

FIELD OF THE INVENTION

The invention pertains to an unmanned helicopter with an internal combustion engine and a dedicated fuel tank.

BACKGROUND OF THE INVENTION

Unmanned aircraft are frequently used for reconnaissance flights over hazardous areas. These unmanned aircraft are radio-controlled. Helicopters are particularly practical for taking reconnaissance photographs because they are able to hover in a practically stationary position and have vertical take-off and vertical landing capabilities.

Conventional unmanned helicopters comprise a main body that accommodates the internal combustion engine and essentially consists of a covered three-dimensional framework. The manufacture of such a design is relatively costly and also results in a heavy construction that may reduce the maximum payload.

OBJECT OF THE INVENTION

The invention is based on the objective of developing an unmanned helicopter that can be easily manufactured and has a compact design.

SUMMARY OF THE INVENTION

This is achieved in that the unit consisting of the internal combustion engine and the transmission is arranged in a self-supporting housing that is at least partially closed on all sides and preferably consists of carbon fiber-reinforced plastic (CFK), with a nose body being connected to the front of the housing.

In addition to the compact design of the unmanned helicopter according to the invention, the housing for accommodating the unit consisting of the internal combustion engine and the transmission may also be realized in an at least partially hollow fashion and used as fuel tank. In this embodiment, it is not necessary to manufacture a separate fuel tank and to install this separate fuel tank with consideration of the position of equilibrium of the helicopter.

In one practical embodiment of the invention, the exhaust of the internal combustion engine is arranged in a recess of the housing that accommodates the unit consisting of the internal combustion engine and the transmission, wherein the recess is open toward the outside and can be closed with a cover.

In order to optimize the cooling of the internal combustion engine, a radiator of the internal combustion engine is arranged on the upper side of the nose body and a coolant flows through the radiator. Consequently, the radiator is directly subjected to the air accelerated by the helicopter rotors such that the cooling effect is optimized.

An oil cooler is advantageously arranged underneath the radiator of the internal combustion engine. This means that the cooling air arriving from the rotors is utilized twice.

The exhaust is cooled in order to remain inconspicuous to thermal imaging cameras. This is realized by surrounding the exhaust of the internal combustion engine with a double casing, wherein the cooling air arriving from the radiator flows through the outer annular space and the cooling air arriving from the rotor bearing of the internal combustion engine flows through the adjacent inner annular space.

The invention is described in greater detail below with reference to one embodiment that is illustrated in the figures. However, the invention is not limited to this particular embodiment.

BRIEF DESCRIPTION OF THE DRAWING

The figures show:

FIG. 1, a schematic representation of a helicopter according to the invention;

SPECIFIC DESCRIPTION

Figure 4:
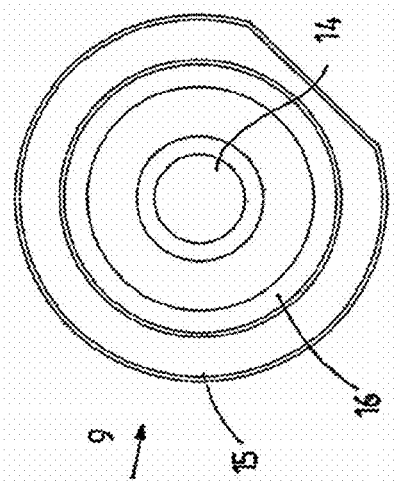
FIG. 4, a section through the exhaust.
Figure 2:
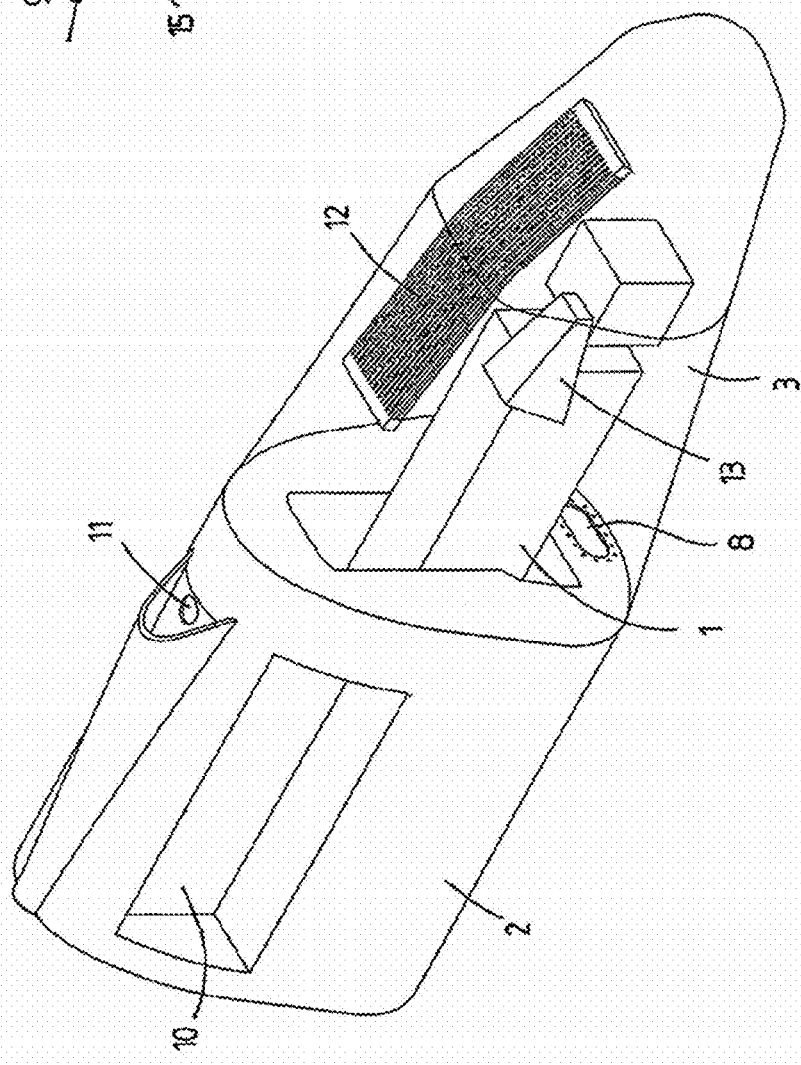
FIG. 2, a schematic representation of the housing for accommodating the internal combustion engine and of the nose body, wherein this illustration is enlarged in comparison with FIG. 1.
Figure 3:
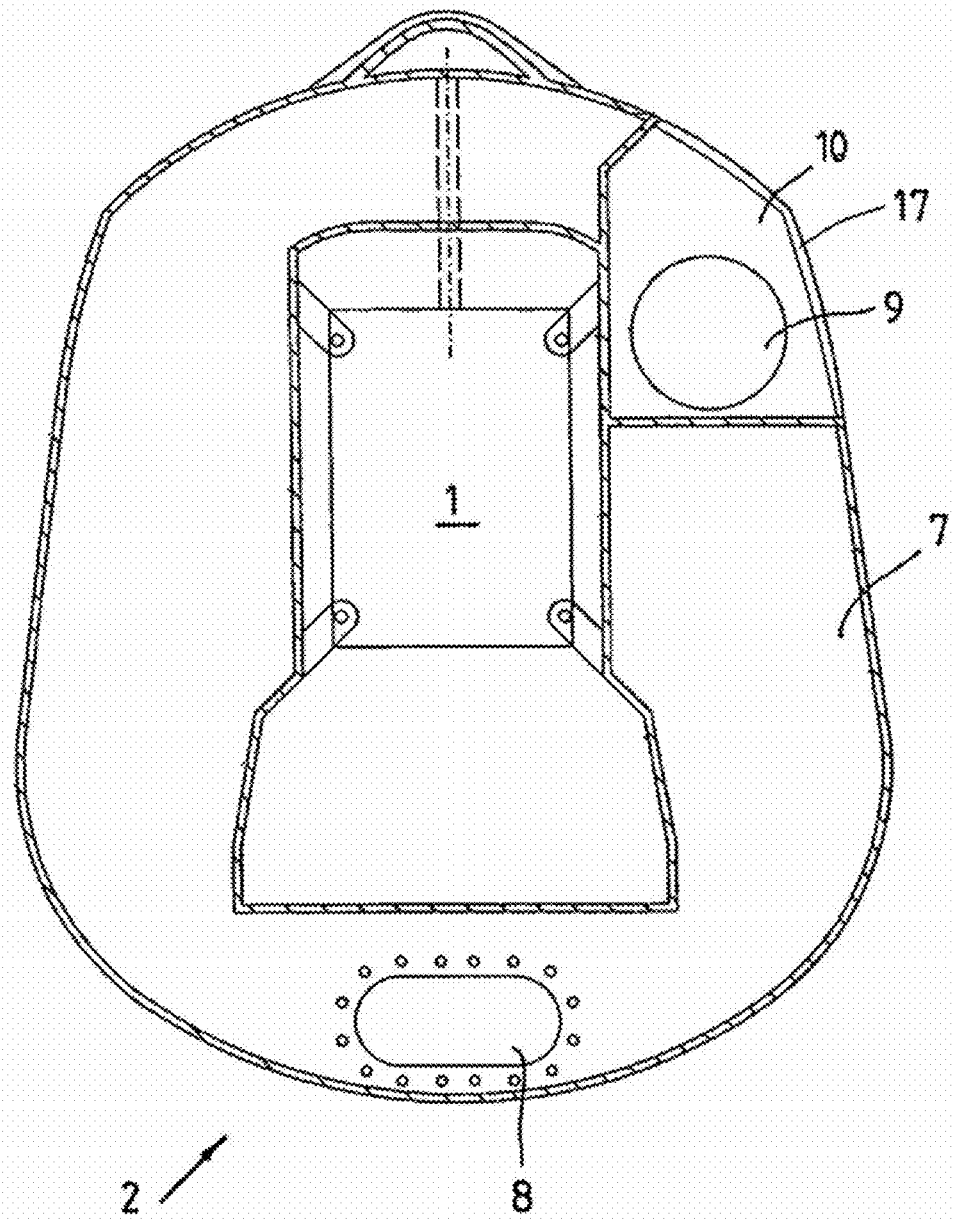
FIG. 3, a section through the housing provided with the fuel tank.

The figures show that a helicopter according to the invention comprises a housing 2 that essentially accommodates the unit 1 consisting of the internal combustion engine and the transmission, wherein a nose body 3 is connected to the housing 2 and the unit 1 protrudes into this housing 2. A tail section 4 is connected to the rear of the housing 2. The internal combustion engine of the unit 1 is realized in the form of a rotary engine that drives a main rotor 5 and a tail rotor 6.

The housing 2 for accommodating the unit 1 is realized in a hollow fashion, and the hollow space serves as a fuel tank 7 that is provided with a fuel line 8. A recess 10 of the housing 2 is open toward the outside and accommodates the exhaust 9, the design of which is discussed below with reference to FIG. 4. A through-opening 11 is provided for the shaft of the main rotor 5.

A radiator 12 of the internal combustion engine is arranged on the upper side of the nose body 3, and a coolant flows through this radiator. The radiator 12 is subjected to the air current generated by the main rotor 5 such that the cooling effect is optimized. The air emerging from the radiator 12 subsequently flows through an oil cooler 13.

The exhaust 9 is cooled in order to remain inconspicuous to thermal imaging cameras. According to FIG. 4, the conical exhaust pipe 14 is surrounded by a double casing. The cooling air arriving from the radiator 12 flows through the outer annular space 15, and the cooling air arriving from the rotor bearing of the internal combustion engine flows through the inner annular space 16. This makes it possible to largely isolate the exhaust gas flowing through the exhaust pipe 14. In addition, the recess 10 containing the exhaust 9 is closed with a cover 17.

The scope of the invention allows various modifications. For example, the cooling could be realized in a different way. It would also be possible to arrange the exhaust at a different location, etc.

The invention claimed is:

1. An unmanned helicopter comprising:
   a self-supporting housing closed on all sides and formed of carbon-reinforced plastic;
   a central unit inside the housing and holding an internal-combustion engine and a transmission inside the hollow unit, the unit forming with the housing a space surrounding the unit and adapted to hold fuel; and
   a helicopter nose body connected to and projecting forwardly from the housing, the engine and transmission projecting into the nose body.

2. The unmanned helicopter according to claim 1 wherein exhaust of the internal combustion engine is arranged in a recess of the housing, the recess being open toward the outside and closable with a cover.

3. The unmanned helicopter according to claim 1 wherein a radiator of the internal combustion engine is arranged on the upper side of the nose body and a coolant flows through this radiator.

4. The unmanned helicopter according to claim 3 wherein an oil cooler is arranged underneath the radiator of the internal combustion engine.

5. The unmanned helicopter according to claim 1 wherein exhaust of the internal combustion engine is surrounded by a double casing, wherein the cooling air arriving from the radiator flows through the outer annular space and the cooling air arriving from the internal combustion engine flows through the adjacent inner annular space of the double casing.

* * * * *